US005930483A

United States Patent [19]

Cummings et al.

[11] Patent Number: 5,930,483

[45] Date of Patent: Jul. 27, 1999

[54] METHOD AND APPARATUS FOR COMMUNICATIONS CONTROL ON A SMALL COMPUTER SYSTEM INTERFACE

[75] Inventors: Peter Allen Cummings; Brian Lee Morger, both of Rochester, Minn.; Richard Rolls, San Jose, Calif.; Teras Eve Yonker, Rochester, Minn.

[73] Assignee: International Business Machines Corporation, Armonk, N.Y.

[21] Appl. No.: 08/762,094

[22] Filed: Dec. 9, 1996

[51] Int. Cl.[6] .................... G06F 13/14

[52] U.S. Cl. .................... 395/287; 395/292; 395/800.01; 395/822; 395/728; 395/200.42; 395/856; 395/306; 395/309; 711/123; 711/146; 711/157; 370/412

[58] Field of Search .................... 395/287, 292, 395/800, 822, 200.42, 856, 306, 309, 728; 711/157, 123, 146; 370/412

[56] References Cited

U.S. PATENT DOCUMENTS

| | | | |
|---|---|---|---|
| 4,425,615 | 1/1984 | Swenson et al. | 364/200 |
| 4,805,090 | 2/1989 | Coogan | 364/200 |
| 4,901,232 | 2/1990 | Harrington et al. | 364/200 |
| 4,933,835 | 6/1990 | Sachs et al. | 711/123 |
| 5,201,053 | 4/1993 | Benhase et al. | 395/725 |
| 5,247,626 | 9/1993 | Firoozmand | 395/200.42 |
| 5,265,211 | 11/1993 | Amini et al. | 395/856 |
| 5,317,713 | 5/1994 | Glassburn | 395/425 |
| 5,327,549 | 7/1994 | Nissimov et al. | 395/425 |
| 5,386,514 | 1/1995 | Lary et al. | 395/250 |
| 5,410,667 | 4/1995 | Belsan et al. | 395/425 |
| 5,428,796 | 6/1995 | Iskiyan et al. | 395/725 |
| 5,519,701 | 5/1996 | Colmant et al. | 370/412 |
| 5,557,769 | 9/1996 | Bailey et al. | 711/146 |
| 5,566,345 | 10/1996 | Ostrowski | 395/822 |
| 5,659,713 | 8/1997 | Goodwin et al. | 711/157 |

*Primary Examiner*—Ayaz R. Sheikh
*Assistant Examiner*—Frantz Blanchard Jean
*Attorney, Agent, or Firm*—Joan Pennington

[57] ABSTRACT

A method and apparatus are provided for controlling communications on a small computer system interface (SCSI). A cache memory is arranged for storing an input queue, a status queue and a cache operation queue. An input engine detects unsolicited data from the SCSI and transfers the detected unsolicited data to the input queue. A status engine transfers status information between the SCSI and the status queue. A cache engine transfers data between the SCSI and the cache operation queue. Each of the input engine, the status engine, and the cache engine is independent to enable full duplex operation. A connection arbitrator is shared between the input engine, the status engine, and the cache engine enabling a connection to be shared by the input engine, the status engine, and the cache engine.

9 Claims, 6 Drawing Sheets

METHOD AND APPARATUS FOR COMMUNICATIONS CONTROL ON A SMALL COMPUTER SYSTEM INTERFACE

FIELD OF THE INVENTION

The present invention relates to the data processing field, and more particularly, relates to method and apparatus for controlling communications on a small computer system interface (SCSI).

DESCRIPTION OF THE PRIOR ART

The SCSI bus performance of DASD devices remains an important consideration in overall storage system performance. Certain aspects of SCSI bus performance are dictated by the transport protocol. For example, a 20 MB/sec interface can only run at one speed. If the protocol requires a round trip delay to establish a connection then nothing can be done to shorten this.

New high speed serial transport protocols, such as a fiber channel communications protocol, are capable of supporting SCSI. These new high speed serial transport protocols offer unique opportunities for improving bus performance. All performance improvements must adhere to the ANSI SCSI Architectural Model (SAM) rules concerning the order in which tasks (commands) come into existence, are processed, and go out of existence. The rules generally state that the behavior of the device as viewed at the SCSI interface must be sequential with respect to certain ordering events, such as, task management functions and errors. While various internal arrangements can be used, the device externally at the SCSI interface must appear sequential.

SUMMARY OF THE INVENTION

A principal object of the present invention is to provide an improved method and apparatus for controlling communications on a small computer system interface (SCSI). Other objects are to provide such method and apparatus substantially without negative effects, and that overcome many of the disadvantages of prior art arrangements.

In brief, method and apparatus are provided for controlling communications on a small computer system interface (SCSI). A cache memory is arranged for storing an input queue, a status queue and a cache operation queue. An input engine detects unsolicited data from the SCSI and transfers the detected unsolicited data to the input queue. A status engine transfers status information between the SCSI and the status queue. A cache engine transfers data between the SCSI and the cache operation queue.

In accordance with features of the invention, the input engine, the status engine, and the cache engine are independent to enable full duplex operation. A connection arbitrator is shared between the input engine, the status engine, and the cache engine enabling a connection to be shared by the input engine, the status engine, and the cache engine for multiple transfers.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
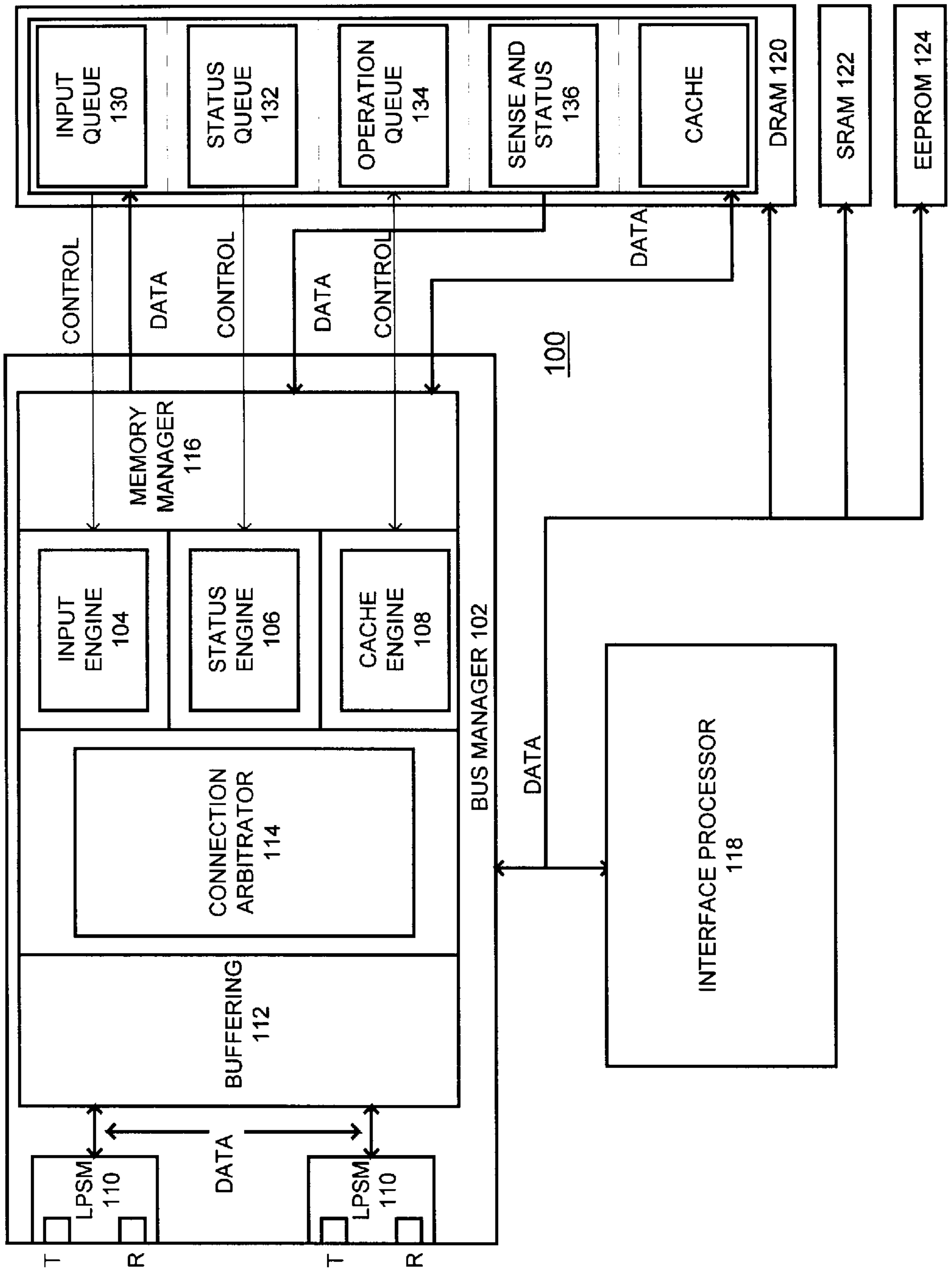
FIG. 1 is a schematic and block diagram of a computer system including a small computer system interface (SCSI) bus manager embodying the present invention.

Having reference now to the drawings, in FIG. 1 there is shown a computer system 100 including a small computer system interface (SCSI) bus manager 102 of the present invention. SCSI bus manager 102 divides SCSI bus activities into three functions with a respective separate hardware execution unit including an input engine 104, a status engine 106 and a cache engine 108, dedicated to each function. The input engine 104 supports unsolicited data. Commands are the most common form of unsolicited data. The status engine 106 supports status transfers. The cache engine 108 supports data transfers. In accordance with features of the invention, SCSI bus manager 102 improves bus utilization by reducing or eliminating the need for software intervention between the time a command arrives and the time a next command can be received. SCSI bus manager 102 supports full duplex operation for the simultaneous receipt and transmission of data. SCSI bus manager 102 improves bus utilization by reducing an average number of connections per command.

As shown in FIG. 1, the SCSI bus manager 102 includes a pair of fiber channel ports or identical loop port state machines (LPSMs) 110. Each LPSM 110 includes an external transmitter T and an external receiver R for full duplex operation. SCSI bus manager 102 includes a buffering function 112, a connection arbitrator 114 coupled between the LPSMs 110 and the input engine 104, the status engine 106 and the cache engine 108, and a memory manager 116.

Data is coupled between the SCSI bus manager 102, an interface processor 118, a dynamic random access memory (DRAM) 120, a static random access memory (SRAM) 122 and an electrically erasable programmable read only memory (EEPROM) 124. Multiple operations are linked and executed by the SCSI bus manager 102 without intervention by the interface processor 118. Three principal SCSI bus manager functions include the transfer unsolicited data from the bus to an input queue 130 performed by the input engine 104, data transfer to and from the bus and cache memory performed by the cache engine 108, and status transfer to the bus performed by the status engine 106. The buffering function 112 stores received frames temporarily for matching speed between the bus and the cache DRAM 120.

Figure 2B:
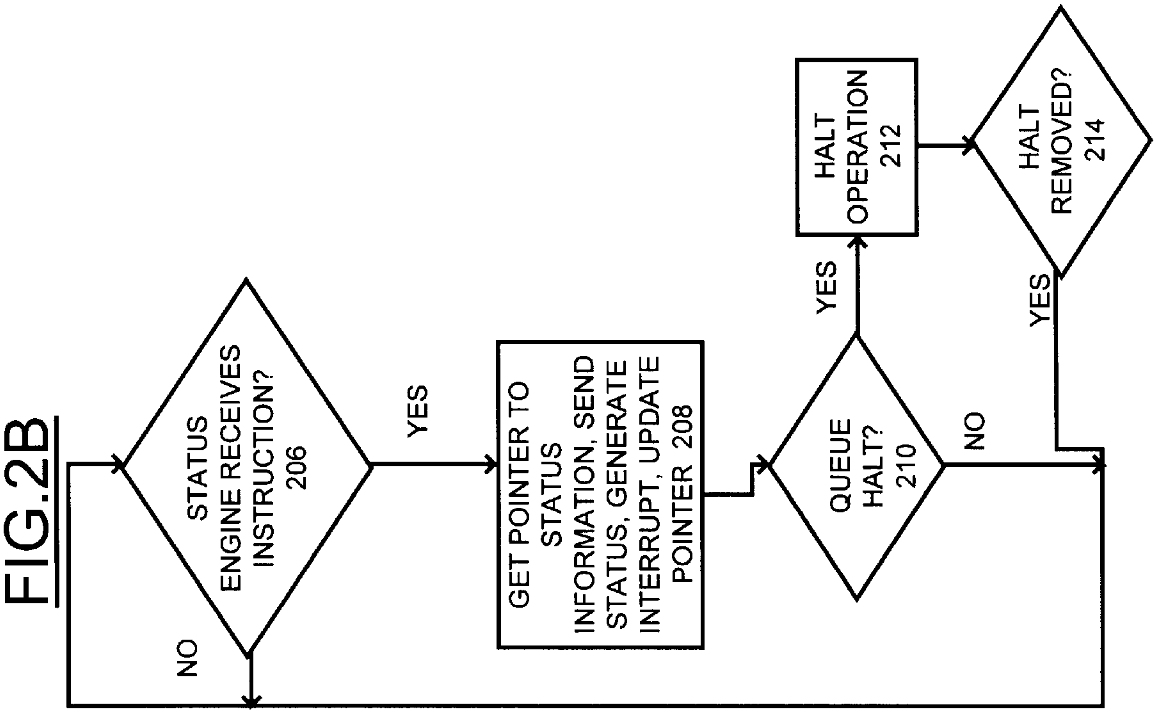
FIGS. 2A, 2B, 2C and 2D are logical flow charts illustrating parallel operations of an input engine, a status engine, a cache engine, and a connection arbitrator of the small computer system interface (SCSI) bus manager of FIG. 1.
Figure 2A:
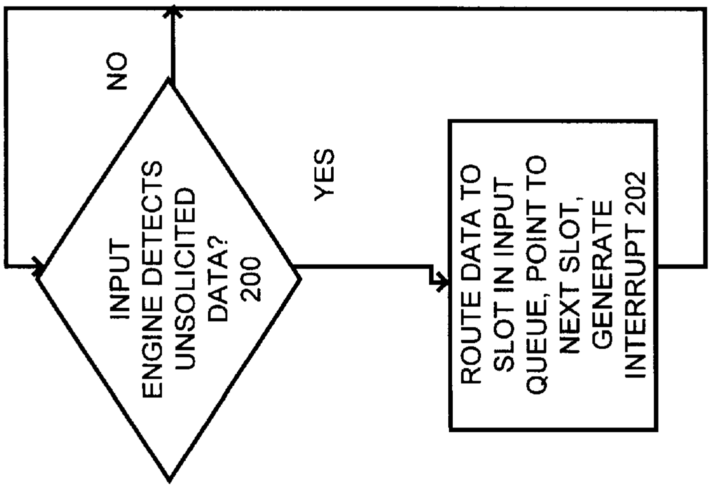

Referring also to FIG. 2A, the input engine 104 detects unsolicited data as indicated at a decision block 200, which typically are commands coming in from the SCSI interface and routes the unsolicited data to the input queue 130. The input queue 130 is a singly linked list of empty slots which reside in DRAM 120 shared by software and the input engine 104. The input engine 104 puts the data in a slot, points to the next slot and generates a software interrupt as indicated at a block 202. At this time the input engine 104 is able to accept more unsolicited data without waiting for software intervention, returning to block 200.

Because the input engine 104 is independent it can receive unsolicited data while one of the status or cache engine is transmitting data, achieving full duplex operation. Because software intervention is not required between commands, the input engine 104 can receive another command immediately.

Referring to FIG. 2B, the status engine 106 is instructed from a singly linked list status queue 132 which resides in DRAM 120 shared by the status engine and software as indicated at a decision block 206. Each entry in the status queue 132 contains pointers to the SCSI status information and may also contain the sense information if auto-sense is supported, as indicated at a sense and status queue 136. As each SCSI status is sent an interrupt is generated, the pointer is updated to the next operation in the linked list as indicated at a block 208. Unless a queue halt is identified as indicated at a decision block 210, the procedure is repeated returning to block 206. Software sets up the operations, but no software intervention is required between operations. When a queue halt is identified at block 210, the next operation in the queue is halted as indicated at a block 212. When a halt removed is identified as indicated at a decision block 214, the procedure is repeated, returning to block 206.

Because the status engine 106 is independent it can send status while one of the input or cache engine 104 or 108 is receiving data, thus achieving full duplex operation. Because no software intervention is required between operations, multiple status can be transferred on a single connection.

Figure 2C:
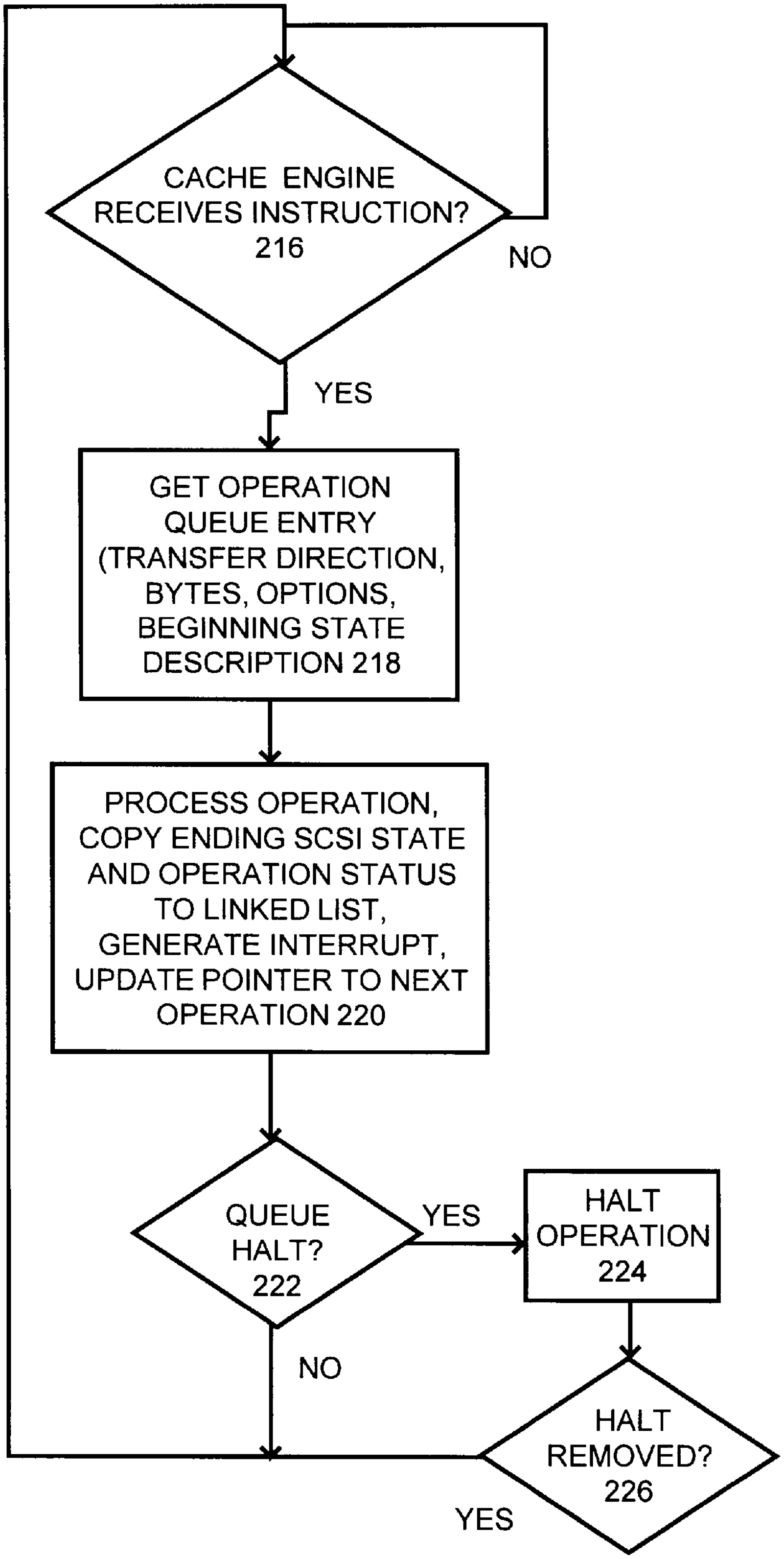

Referring to FIG. 2C, the cache engine 108 is instructed from a singly linked list operation queue 134 whose entries reside in DRAM 120 shared by the cache engine and software as indicated at a decision block 216. Each entry in the operation queue 134 contains both the hardware instructions, for example, transfer direction, bytes to transfer, options, and the like, and a description of the beginning state for the transfer, for example, queue tag, sequence ID, current byte offset, and the like obtained by the cache engine as indicated at a block 218. When the cache engine 108 completes an operation the ending SCSI state and operation status are copied out to the linked list, an interrupt is generated, the pointer is updated to the next operation as indicated at a block 220. Unless a queue halt is identified as indicated at a decision block 222, the procedure is repeated returning to block 216. Software sets up the operations, but no software intervention is required between operations. In particular, all operation, state and status information resides in the operation queue 134, therefore there is no time critical requirement for the software to respond to the completion interrupt. When a queue halt is identified at block 222, the next operation in the queue is halted as indicated at a block 224. When a halt removed is identified as indicated at a decision block 226, the procedure is repeated, returning to block 216.

Because there is no software intervention between operations, multiple transfers can occur on a single connection. The transfers may be associated with the same command or different commands. Because the cache engine 108 is independent it can send or receive data while another engine 104 or 106 is receiving or sending data, thus achieving full duplex operation.

Figure 2D:
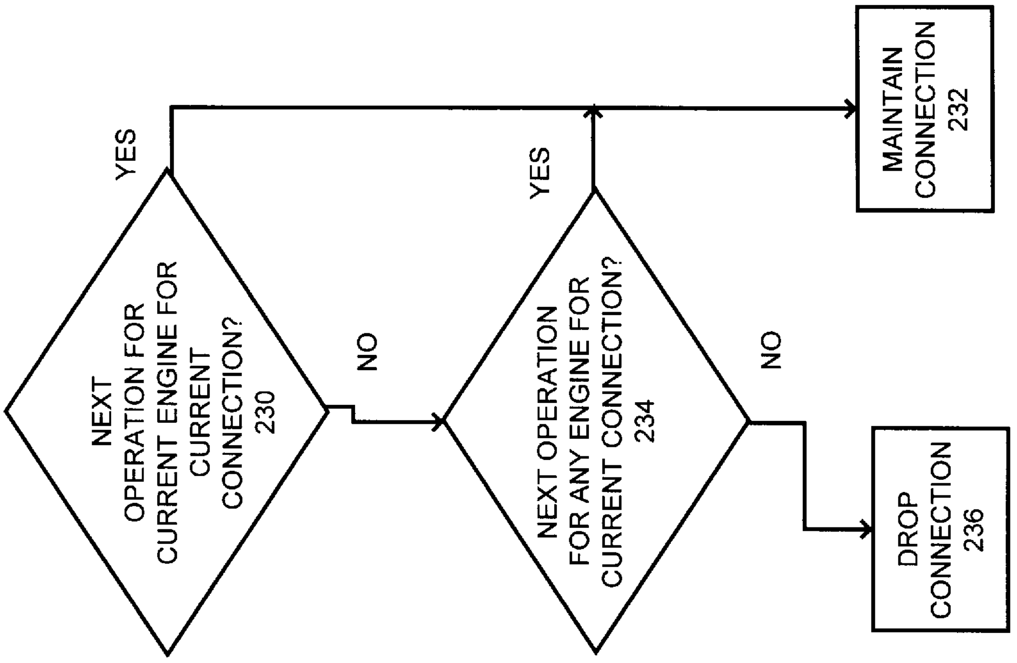

Referring to FIG. 2D, the connection arbitrator 114 is shared by the input engine 104, the status engine 106 and the cache engine 108. While each engine 104, 106 and 108 has the capability to operate independently, the input engine 104, the status engine 106 and the cache engine 108 also cooperate to reduce the number of connections. The connection arbitrator 114 includes a look-ahead feature such that the connection is not dropped if the next operation for a currently connected engine is addressed to the current connection as indicated at a decision block 230. This insures that if an engine 104, 106, or 108 contains several operations addressed to the same initiator, the connection is maintained or not dropped between operations as indicated at a block 232. The connection arbitrator 114 does not allow a bus connection to be dropped by any engine while there is any engine whose current operation is addressed to the same initiator as indicated at a decision block 234. A bus connection is dropped when the next operation for all the engines 104, 106 and 108 is not for the current connection as indicated at a decision block 236.

Because a connection is shared between all three engines 104, 106, and 108, and shared by multiple entries in the queue of any engine 104, 106, or 108, the average number of connections per command is reduced.

Processing of the status queue 132 and cache operation queue 134 can be halted by software or hardware as indicated at decision blocks 210 and 222 in FIGS. 2B, 2C. The queue halt prevents a next operation in the queue 132, 134 from being executed, but does not stop the current operation. Processing is resumed when software removes the halt indicated at decision blocks 214 and 226 in FIGS. 2B, 2C. As a result of queue halt and the FIFO organization of the queues 132 and 134, all operations in the two queues 132 and 134 except for the current operation can be manipulated by software without concern of simultaneous access by software and hardware, even when the current operation is active. This allows the software to halt the queue, modify the queue, and remove the halt without disrupting the current operation. The current operation in either queue can be interrogated after the current operation completes.

Queue halt is initiated by software, for example, to remove entries from the queue or reorder the queue. For example, if an abort was issued the software could halt the queues and remove work for the aborted command. Queue halt is initiated by hardware in response to certain events detected on the SCSI bus. These events are protocol specific, and include resets, Loop Initialization Procedures and Loop Port Bypass.

Figure 3A:
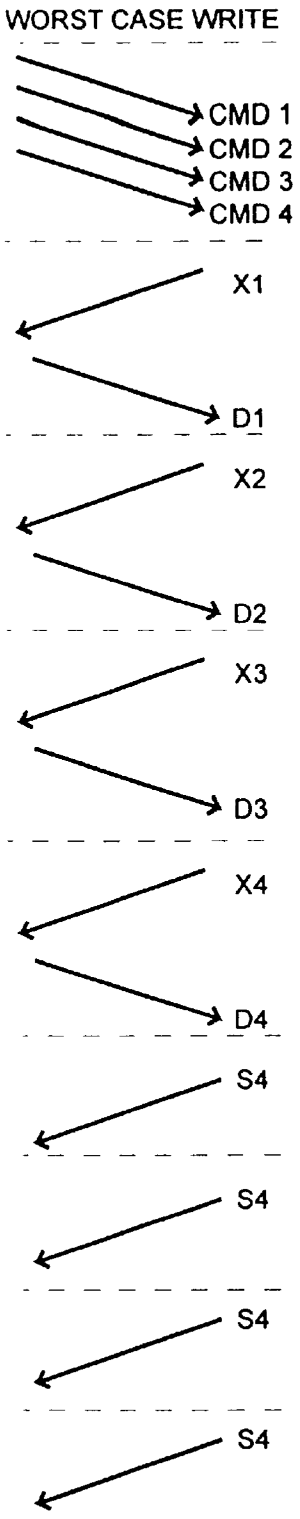
FIG. 3A is a sequence chart illustrating a conventional write sequence where the dotted lines represent the establishment of a connection.
Figure 3B:
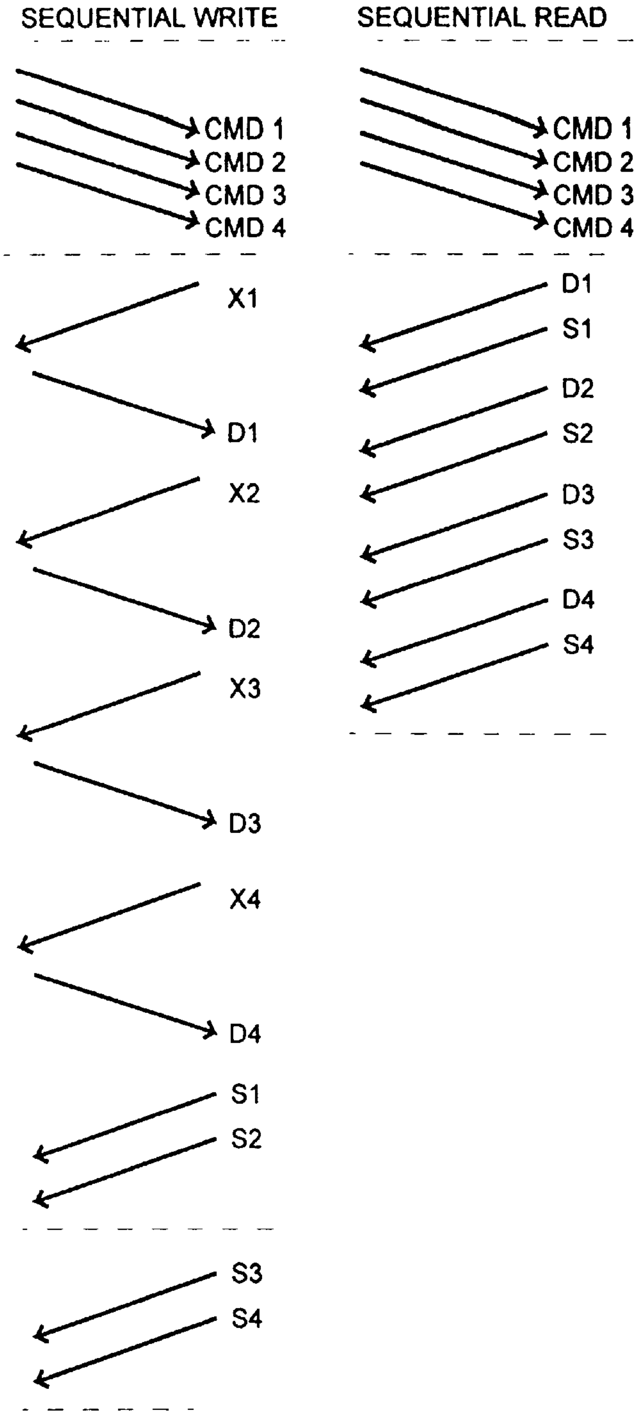
FIG. 3B is a sequence chart illustrating exemplary write and read sequences of the invention with the small computer system interface (SCSI) bus manager of FIG. 1.
Figure 3C:
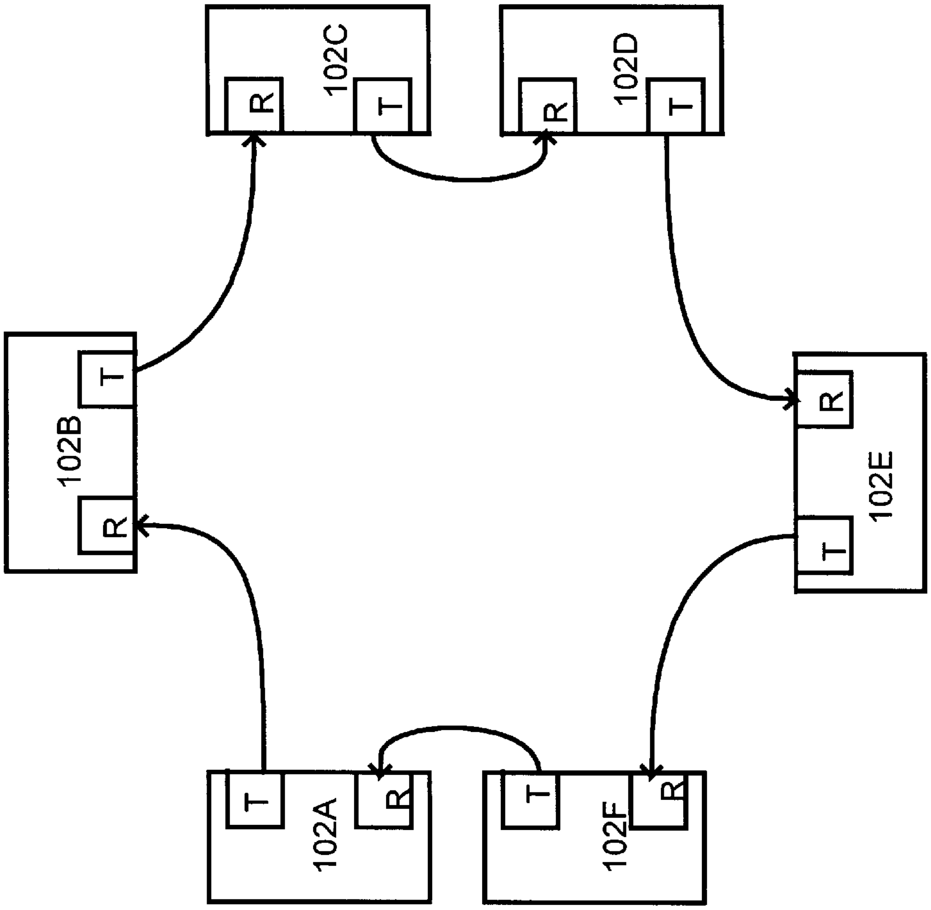
FIG. 3C is a block diagram representation of a fiber optic ring communications system embodying the present invention.

Referring now to FIGS. 3A, 3B and 3C, the bus utilization improvement resulting from the SCSI bus manager 102 of the preferred embodiment may be understood. In FIG. 3A there is shown a conventional write sequence. FIG. 3B illustrates exemplary write and read sequences of the invention with the small computer system interface (SCSI) bus manager 102. IN FIGS. 3A and 3B, the dotted lines represent the establishment of a connection, the arrows represent frames. Arrows pointing to the right represent frames from an initiator, arrows pointing to the left represent frames from the target. Frames labeled X1–X4 represent transfer ready frames, frames labeled D1–D4 represent data frames and frames labeled S1–S4 represent status frames. In the conventional SCSI bus write sequence, a connection is required with each status frame and respective transfer ready and data frames. With the SCSI bus manager 102, multiple transfer ready and data frames and status frames can be transferred with a single bus connection, as illustrated in the exemplary write and read sequences of FIG. 3B.

FIG. 3C illustrates a fiber optic ring communications system where each of the seven ports includes a SCSI bus manager 102A–102F embodying the present invention. As shown, each port includes one transmitter T and one receiver R, the transmitter T of one port being connected to the receiver of the next port. Frames are passed from port to port with each port adding a delay. There can be up to 127 ports in the loop. A connection requires a frame to be sent around the loop a minimum of one and a half times. The reduction of the number of connections by the SCSI bus manager 102 significantly improves bus performance.

The bus performance improvements are provided by SCSI bus manager 102 which adheres to the ANSI SCSI Architectural Model (SAM) rules concerning the order in which tasks (commands) come into existence, are processed, and go out of existence. The rules generally state that the behavior of the device as viewed at the SCSI interface must be sequential with respect to certain ordering events. If the ordering events are not present, then commands and status can be accepted and sent in any order. When a task ordering event occurs, all status from before the event must be sent before the event status, and no status from after the event can be sent until the event status is returned. The operation of the parallel hardware engines 104, 106 and 108 is provided within the SAM constraints, which are sequential in nature. The three parallel engines 104, 106, and 108 and the connection arbitrator 114 adhere to SAM rules.

Tasks in the input queue 130 must be processed in the order received since task state changes which are caused by the initiator are, by definition, temporal. For example, the ordered queue tag changes task state by defining a boundary. All events which occur before it must be completed before any events received after it. Since the input queue 130 is first-in first-out (FIFO), the order in which commands arrive is preserved.

Similarly, the status queue 132 meets SAM requirements because the status queue 132 is a FIFO. The hardware guarantees the order in which status is sent, therefore status entries put in the queue 132 in the proper order are sent in the proper order. SAM does not place any rules on the cache operation queue 134 which are implemented directly in hardware. However, as described above, with a queue halt it is possible for software to remove or reorder cache operation queue entries in response to task ordering events.

While the present invention has been described with reference to the details of the embodiments of the invention shown in the drawing, these details are not intended to limit the scope of the invention as claimed in the appended claims.

What is claimed is:

1. Apparatus for controlling communications on a small computer system interface (SCSI) comprising:

a cache memory arranged for storing an input queue, a status queue and a cache operation queue;

an input engine for detecting unsolicited data from the SCSI and for transferring the detected unsolicited data to said input queue;

a status engine for transferring status information between the SCSI and said status queue;

a cache engine for transferring data between the SCSI and said cache operation queue;

each of said input engine, said status engine and said cache engine being a separate hardware execution unit and each being independent, supporting simultaneous receipt and transmission of data; and a connection arbitrator coupled between the SCSI and each of said input engine, said status engine and said cache engine for arbitrating a connection, and wherein said connection arbitrator includes a look-ahead feature for processing multiple operations during each said connection; said connection arbitrator being shared by said input engine, said status engine and said cache engine; said connection arbitrator look-ahead feature performing the steps of: checking for a next operation for a current engine of said input engine, said status engine or said cache engine; responsive to an identified next operation for a current engine maintaining said connection; responsive to a next operation for a current engine not being identified, checking for a next operation for any engine of said input engine, said status engine and said cache engine; responsive to an identified next operation for any engine, maintaining said connection; and responsive to a next operation for any engine not being identified, dropping said connection.

2. Apparatus for controlling communications on a small computer system interface (SCSI) as recited in claim 1 wherein said cache memory comprises dynamic random access memory means.

3. Apparatus for controlling communications on a small computer system interface (SCSI) as recited in claim 1 further include queue halt means for halting processing of said status queue.

4. Apparatus for controlling communications on a small computer system interface (SCSI) as recited in claim 1 further include queue halt means for halting processing of said cache operation queue.

5. A method for controlling communications on a small computer system interface (SCSI) comprising the steps of:

utilizing a bus manager including independent hardware execution engines for executing multiple linked operations without intervention by an interface processor and a connection arbitrator shared by said hardware execution engines, said independent hardware execution engines including an input engine for detecting unsolicited data, a status engine for transferring status information, and a cache engine for transferring data between the SCSI and a cache memory;

establishing a bus connection for a current operation by one of said independent hardware execution engines;

checking for a next operation for said established bus connection for said one of said independent hardware execution engines and maintaining said bus connection responsive to an identified next operation for said one engine;

checking for a next operation for said established bus connection for another of said independent hardware execution engines and maintaining said bus connection responsive to an identified next operation for said other engine; and dropping said bus connection responsive to no identified next operation for said established bus connection for said independent hardware execution engines.

6. A method for controlling communications on a small computer system interface (SCSI) comprising the steps of:

providing a cache memory for storing an input queue, a status queue and a cache operation queue;

utilizing an input engine, detecting unsolicited data from the SCSI and transferring the detected unsolicited data to said input queue;

utilizing a status engine, transferring status information between the SCSI and said status queue;

utilizing a cache engine, transferring data between the SCSI and said cache operation queue;

utilizing a connection arbitrator shared by said input engine, said status engine and said cache engine, utilizing said connection arbitrator, establishing a bus connection for a current operation by one of said input engine, said status engine and said cache engine; and utilizing said connection arbitrator, checking for a next operation for said established bus connection for said one of said input engine, said status engine and said cache engine and maintaining said bus connection responsive to an identified next operation for said one engine.

7. A method for controlling communications on a small computer system interface (SCSI) as recited in claim 6 includes the step of utilizing said connection arbitrator, checking for a next operation for said established bus connection for another of said input engine, said status engine and said cache engine and maintaining said bus connection responsive to an identified next operation for said another engine.

8. A method for controlling communications on a small computer system interface (SCSI) as recited in claim 7 includes the step of utilizing said connection arbitrator, dropping said bus connection responsive to no identified next operation for said established bus connection for said input engine, said status engine and said cache engine.

9. A small computer system interface (SCSI) bus controller for a direct access storage device (DASD) comprising:

a cache memory arranged for storing an input queue, a status queue and a cache operation queue;

an input engine for detecting unsolicited data from the SCSI and for transferring the detected unsolicited data to said input queue;

a status engine for transferring status information between the SCSI and said status queue;

a cache engine for transferring data between the SCSI and said cache operation queue; and a connection arbitrator coupled between the SCSI and each of said input engine, said status engine and said cache engine for establishing a connection for a current operation by one of said input engine, said status engine and said cache engine; said connection arbitrator being shared by said input engine, said status engine and said cache engine and said connection arbitrator including a look-ahead feature for checking for a next operation for said connection for said one of said input engine, said status engine and said cache engine and for maintaining said connection responsive to an identified next operation for said one engine.

* * * * *